3,769,406
TREATING HYPERGLYCEMIA WITH PHOSPHO-
RYLATED GUANIDINES AND BIGUANIDINES
Jésus Anatol, Paris, Henri Michel Vidalenc, Montmorency, and Gérard Paul Marie Henri Loiseau, Sceaux, France, assignors to Ugine Kuhlmann, Paris, France
No Drawing. Filed June 17, 1971, Ser. No. 154,209
Claims priority, application France, June 19, 1970, 7022648
Int. Cl. A61k 27/00
U.S. Cl. 424—211
2 Claims

ABSTRACT OF THE DISCLOSURE

Process for the treatment of hyperglycemia which comprises administering to the patient a compound of the formula:

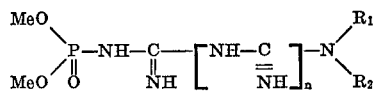

in which Me represents a cation, $n$ represents 0 or 1 and

represents the residue of a primary or secondary aliphatic, isocyclic or heterocyclic amine not containing an ionic group, and $R_1$ and $R_2$ may be linked together so as to form a heterocyclic ring.

---

The present invention relates to new hypoglycemic medicaments derived from guanidines.

The hypoglycemic action of certain guanidines is already known, but the most active products have a considerable toxicity which is all the more harmful when they are used in cures of long duration.

According to the present invention there are provided phosphorylated derivatives of guanidines and biguanidines the ratios: lethel dose 50/active dose 50 of which are more advantageous. These derivatives can be represented by the general formula:

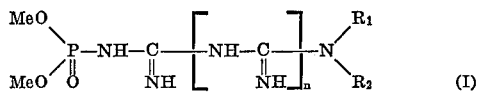

in which Me represents a cation, $n$ represents 0 or 1,

represents the residue of a primary or secondary aliphatic, isocyclic or heterocyclic amine having no ionic group, and $R_1$ and $R_2$ may be linked together so as to form a heterocyclic ring.

The derivatives of the general Formula I in which $n$ represents 0 may be obtained for example by either of two processes which may be represented graphically as follows:

(1) Condensation of a guanidine of the general formula:

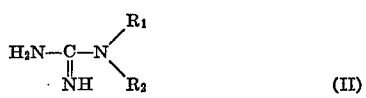

in which

has the same significance as in Formula I, with a diaralkyl phosphite in the presence of carbon tetrachloride and an alkali, then subjecting the diaralkyloxyphosphoryguanidine thus obtained to catalytic hydrogenolysis, for example, according to the reactions:

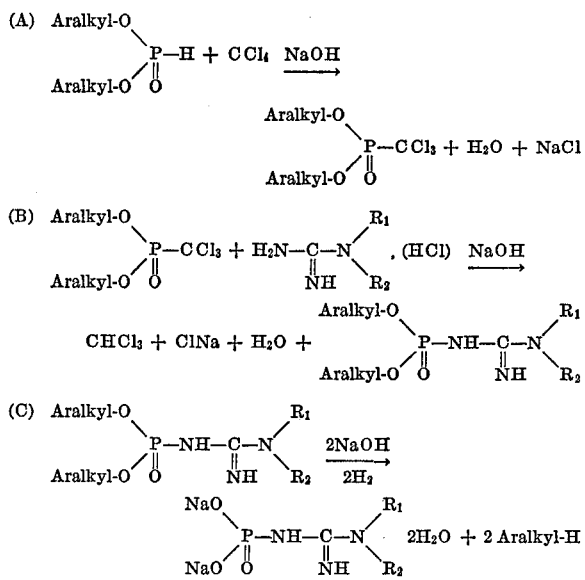

(2) Condensation of a salt of a primary or secondary amine with a salt of a diaralkyloxyphosphoryl derivative of cyanamide of the general formula:

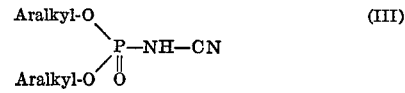

for example according to the reaction:

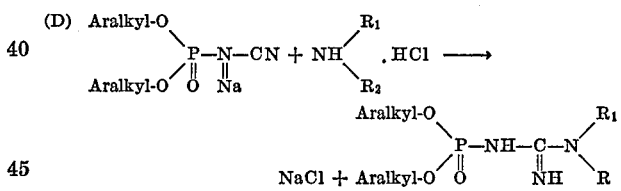

then catalytic hydrogenolysis as in the first process.

Examples of amines of formula

which may be used are diethylamine, pyrrolidine, morpholine, furfurylamine, β-phenylethylamine, piperidine, 2-pyridylamine, cyclohexylamine, benzylamine, benzhydrylamine, aniline and the toluidines.

The diaralkyl phosphites used in the reactions A and D may be substituted or not in the aryl nucleus and examples are dibenzyl, di-p-methoxybenzyl, di-m-methylbenzyl, di-p-chlorobenzyl, di-p-bromobenzyl and di-p-nitrobenzyl phosphites.

The guanidines of the general Formula II may be obtained by the conventional methods, for example by condensing primary or secondary amines with S-alkyl-isothiouronium salts or their acylated derivatives, with the salts of guanyldimethylpyrazole of the formula:

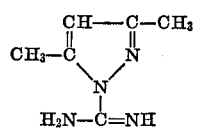

or its derivatives, or with cyanamide. These reactions for the formation of guanidines derived from aliphatic, cycloaliphatic, aromatic or heterocyclic amines may be carried out for example in aqueous medium, in the cold or in the hot, in the presence or absence of catalysts, by heating in organic solvents or by fusion.

The cyanamides of Formula III may be obtained by the process described in French Patent No. 1210435 and 1211099.

In order to carry out reactions A and B it is advantageous to emulsify by means of good agitation of the two phases which are present, the organic phase which contains the carbon tetrachloride and possibly the solvent of the diaralkyl phosphite, and the aqueous phase which contains the alkali. The reaction is preferably effected at low or medium temperature; the diaralkyloxyphosphorylguanidine obtained may be easily separated from the reaction medium either by filtration or, if it is soluble in the organic phase, by distillation of the solvent, possibly under vacuum. The product can then be recrystallised.

Reaction C is carried out in the presence of a catalyst, for example palladium, preferably in aqueous, alcoholic or aqueous-alcoholic medium.

Reaction D can be carried out, for example, in an alcoholic medium at the boil; the mineral salt precipitates and the diaralkyloxyphosphorylguanidine remains in solution. The mineral salt can then be separated by filtration and the alcohol can be eliminated by distillation under reduced pressure; the compound may be purified by recrystallisation. This process is particularly interesting when the corresponding guanidines are only obtained with poor yields by the conventional processes or when they are difficult to purify and to separate from the various products formed during their preparation, and of which the literature has indicated several examples (F. L. Scott, J. Org. Chem., 1957, 22, p. 1569; R. A. B. Bannard et al., Can. J. Chem., 1958, 36, p. 1541).

The derivatives of general Formula I in which $n$ represents 1 may be obtained for example by the process described in French Patent No. 1461378 or in a more general manner, by condensing a biguanide of the general formula:

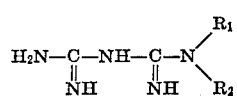

in which

has the same significance as above, with a diaralkyl phosphite in the presence of carbon tetrachloride and an alkali, then by catalytic hydrogenolysis of the diaralkyloxyphosphorylbiguanide thus obtained. The reaction are analogous to reactions A, B and C.

The compounds of general Formula I have a move advantageous chemotherapeutic efficiency than known hypoglycemic medicaments derived from guanidines.

The following examples, in which the parts are by weight, unless the contrary is indicated, are purely illustrative.

EXAMPLE 1

(a) Preparation of $N_{1,1}$-tetramethylene-guanidine sulphate 117 parts by volume of pyrrolidine and 225 parts of water are introduced into an apparatus provided with a stirrer. The temperature rises to 40° C. The mixture is cooled to 30° C. then 278 parts of S-methylisothiouronium sulphate are added in small portions, while avoiding foaming.

The product is left overnight, then refluxed for 8 hours and at the end of the refluxing, the minimum amount of water for solubilising the mass is added, say 225 parts. It is then filtered at the boil and the guanidine sulphate is precipitated by the addition of 1800 parts of absolute ethanol. The yield of crude product is 240 parts, i.e. 72.8% of theory.

This crude product is recrystallised by dissolving in boiling water, filtering and adding absolute ethanol.

Analysis: Calculated (percent): C, 37.04; H, 7.41; N, 25.92; S, 9.88. Found (percent): C, 37.16–37.17; H, 7.88–8.15; N, 25.44–25.63; S, 10.00–10.01.

The $N_{1,1}$-tetramethylene-guanidine sulphate obtained decomposes before melting at 300° C.

(b) Preparation of the dibenzyloxyphosphoryl derivative of $N_{1,1}$-tetramethylene-guanidine 32.4 parts of $N_{1,1}$-tetramethylene-guanidine sulphate and 200 parts of water are introduced into an apparatus provided with a stirrer, and the mixture is stirred to promote solution, then 340 parts by volume of carbon tetrachloride and 170 parts by volume of 31% dibenzyl phosphite are introduced. The mixture is cooled to +10° C. then 240 parts by volume of a 2.5 N solution of caustic soda are added with vigorous stirring. The temperature rises to +30° C. and the mixture is cooled to +20° C. and stirring is maintained for a further 5 hours. The alkalinity is controlled during the whole of this period and, if necessary, the minimal quantity of 2.5 N caustic soda solution is added to maintain this alkalinity.

The next day the product is filtered, decanted, and the organic layer is washed with water until neutral. The carbon tetrachloride is removed by distillation under reduced pressure. The residue, weighing 120 parts, is taken up in 210 parts by volume of isopropyl ether. A crystalline mass is obtained by agitation.

After a night in the refrigerator, it is filtered and the crystals are washed with a little isopropyl eher and dried in an oven at 50° C. 64 parts of crude product are obtained, i.e. 85.8% of theory. This product is recrystallised by dissolving in boiling ethyl acetate, filtering and adding petrol ether and the crystals are dried in an oven at 50° C. Beautiful crystals of M.P. 81–82° C. are obtained.

Analysis: Calculated (percent): C, 61.12; H, 6.43; N, 11.26; P, 8.31. Found (percent): C, 61.46; H, 6.63; N, 11.24; P, 8.50.

(c) Preparation of the disodium salt of $N_{1,1}$-tetramethylene-$N_3$-phosphoryl-guanidine This salt is obtained by hydrogenolysis of the dibenzyloxyphosphoryl derivative in ethanol at 66° C. in the presence of the theoretical amount of caustic soda, the catalyst used being palladium black.

56 parts of palladium black containing 10% of palladium, 56 parts of the dibenzyloxyphosphoryl derivative of tetramethyleneguanidine dissolved in a mixture comprising 150 parts by volume of 2 N caustic soda solution and 300 parts by volume of absolute ethanol are introduced into an apparatus provided with a high-speed stirrer. A stream of hydrogen is passed through until excess is present with continuous vigorous stirring. During this time the apparatus is cooled so that a temperature of 28° C. is not exceeded. The contents of the vessel are filtered and the precipitate is washed with ethanol at 66° C. The volume of the solution is then 600 parts. The disodium salt is precipitated by the addition of 3000 parts of absolute ethanol (turbidity is then observed), then 3000 parts of acetone. The disodium salt precipitates and after standing in the refrigerator for 36 hours it is filtered off, washed on the filter with 60 parts of the 1/1 ethanol-acetone mixture and dried under vacuum to constant weight. The disodium salt crystallised with one molecule of water is obtained. Weight obtained 30.7 parts. Yield 80%.

EXAMPLE 2

(a) Condensation of pyrrolidine hydrochloride and sodium dibenzyloxyphosphorylcyanamide 36 parts by volume of hydrochloric acid, $d=1.19$, are run slowly into an apparatus containing 33.5 parts by volume of pyrrolidine and 100 parts of water. The water is then removed under reduced pressure and the pyrrolidine hydrochloride crystallised. Then 500 parts by volume of ethanol and 129.6 parts of sodium dibenzyloxyphosphorylcyanamide are added. The mixture is refluxed for 4 hours, allowed to cool to 30° C. and filtered in order to separate the sodium chloride formed. The ethanol is then removed under reduced pressure. Weight of residue: 138 parts. The residue is taken up in 276 parts by volume of isopropyl ether. On agitation a solid mass is obtained which is filterable after standing for 48 hours in a refrigerator. The weight of the crude product obtained is 64 parts. It is recrystallized by dissolving in ethyl acetate, filtering and adding petrol ether. The recrystallised product melts at 81° C. like that obtained in the second paragraph of Example 1.

(b) Preparation of the disodium salt of $N_{1,1}$-tetramethylene-$N_3$-phosphoryl-guanidine The operation is as in the third paragraph of Example 1 and the same result is obtained.

EXAMPLE 3

Operating as in Example 1, morpholine is condensed with S-methylisothiouronium sulphate, and the sulphate of the corresponding guanidine is prepared, i.e. $N_{1,1}$-(3-oxapentylene)-guanidine, which decomposes before melting towards 300° C. This product, treated like the sulphate of tetramethyleneguanidine, provides a dibenzyloxyphosphoryl derivative of melting point 76–77° C. which, on hydrogenolysis gives the disodium salt of $N_{1,1}$-(3-oxapentylene)-$N_3$-phosphoryl-guanidine of the formula:

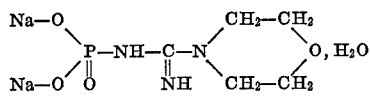

EXAMPLE 4

(a) Preparation of $N_1$-furfurylbiguanide hydrochloride 97 parts of 2-furfurylamine and 200 parts of water are introduced into an apparatus provided with a stirrer, then 90 parts by volume of hydrochloric acid, $d=1.19$, are slowly added with stirring. The water is evaporated under reduced pressure, and the furfurylamine hydrochloride crystallises. Then 84 parts of dicyandiamide are added and the reaction mass is melted by heating at 160° C. for 1 hour. The molten mass is taken up by 500 parts by volume of boiling isopropanol. The solution is filtered. On cooling and seeding, a crude product is obtained which is crystallised by dissolving in boiling ethanol, filtering, decolourising with carbon black, filtering again and precipitating with isopropyl ether. The crystalline product obtained has a melting point of 162–163° C.

(b) Phosphorylation of the $N_1$-furfurylbiguanide hydrochloride 43.5 parts of furfurylbiguanide hydrochloride and 200 parts of water are introduced into an apparatus provided with a stirrer. The mixture is stirred until solution occurs, then 340 parts by volume of carbon tetrachloride and 170 parts by volume of 31% dibenzyl phosphite are introduced. The mixture is cooled to +10° C. then 240 parts by volume of a 2.5 N caustic soda solution is run in a period of 5 minutes with vigorous stirring. The temperature rises to +30° C. and the mixture is cooled again to +20° C. Stirring is continued for 5 hours while, if necessary, the alkalinity is maintained by the addition of the minimal amount of 2.5 N caustic soda. The next day the product is filtered, decanted, and the organic layer is washed with water until neutral. The carbon tetrachloride is removed by distillation under reduced pressure. The residue, weight 130 parts, is taken up at the boil by 130 parts of ethyl acetate, and the solution is filtered and isopropyl ether is added until turbidity is obtained. A mass which slowly crystallises is obtained. It is filtered after standing for 2 days in a refrigerator, washed with a 1/1.5 mixture of ethyl acetate and isopropyl ether, and dried in an oven at 60° C. The product is recrystallised by dissolving in 2 volumes of boiling ethyl acetate, filtering and crystallising by cooling in a refrigerator for 24 hours after seeding. Melting point of recrystallised product: 99–101° C.

Analysis of the $N_5$-dibenzyloxyphosphoryl-$N_1$-furfuryl-biguanide: Calculated (percent): C, 57.14; H, 5.44; N, 15.78; P, 7.03. Found (percent): C, 57.34–57.39; H, 5.65–5.80; N, 15.58–15.56; P, 7.05–7.26.

(c) Preparation of the disodium salt of $N_5$-phosphoryl-$N_1$-furfuryl-biguanide This salt is obtained by hydrogenolysis of the dibenzyloxyphosphoryl derivative in ethanol at 50° C. in the presence of the theoretical amount of caustic soda, the catalyst used being active carbon palladium black.

53 parts of palladium black containing 10% of palladium, then 53 parts of the dibenzyloxyphosphoryl derivative of furfurylbiguanide, previously suspended in a mixture of 240 parts by volume of absolute ethanol and 240 parts by volume of a normal solution of caustic soda, are introduced into an apparatus provided with a high-speed stirrer. A stream of hydrogen is passed in until excess is present, under continuous vigorous stirring. During this time the apparatus is cooled so that the interior temperature does not exceed 28° C. The contents of the apparatus are filtered and the palladium black is washed with ethanol at 50° C. The volume of the solution is 620 parts and the disodium salt is precipitated by the addition of 3100 parts by volume of absolute ethanol. After 24 hours in a refrigerator a precipitate separates. The mother liquors are then decanted and the precipitate is dissolved by stirring with 500 parts by volume of isopropanol. After standing for 48 hours in a refrigerator, beautiful crystals are obtained, which are filtered off, washed with isopropanol and dried in vacuo until their weight is constant. The anhydrous disodium salt is obtained. Weight obtained 28.5 parts. Yield: 77%.

Analysis: Calculated (percent): C, 27.54; H, 3.28; N, 22.95; P, 10.16. Found (percent ): C, 28.34; H, 4.79; N, 23.30; P, 10.12.

EXAMPLES 5, 6 AND 7

By operating in the manner of Example 4, the $N_5$-dibenzyloxyphosphoryl derivatives of the $N_{1,1}$-(3-oxapentylene), $N_1$-cyclohexyl, and $N_1$-benzyl biguanides may be prepared, the melting points of which are respectively: 115–116° C., 154–156° C., and 98.5–99.2° C. By hydrogenolysis these phosphoryl biguanides provide respectively products of the formulae:

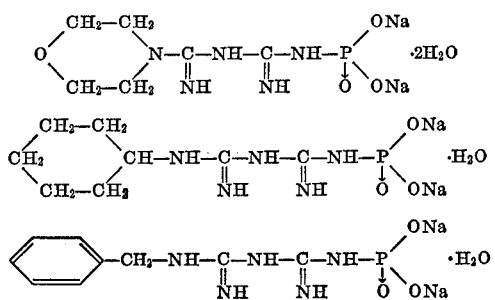

TOXICOLOGICAL AND PHARMACOLOGICAL PROPERTIES

(I) Toxicity

The acute toxicity of the following products:

Disodium salt of $N_{1,1}$-tetramethylene-$N_3$-phosphoryl-guanidine (Examples 1 and 2)

Disodium salt of $N_{1,1}$-(3-oxa-pentylene)-$N_3$-phosphoryl-guanidine (Example 3)

Disodium salt of $N_5$-phosphoryl-$N_1$-furfuryl-biguanide (Example 4)

Disodium salt of $N_5$-phosphoryl-$N_{1,1}$-(3-oxa-pentylene)-biguanide (Example 5)

Disodium salt of $N_5$-phosphoryl-$N_1$-cyclohexyl-biguanide (Example 6)

Disodium salt of $N_5$ - phosphoryl-$N_1$-benzyl-biguanide (Example 7)

has been studied by way of example, with the mouse CD 1 (Charles River) by intravenous and oral examination. The products have been administered in solution in the physiological solution in the first case and in aqueous solution in the second case, at the rate of 1 ml./20 g. of body weight.

The LD 50, calculated after 3 days observation by the cumulative quantal method, are collected in the following table:

| Product | Toxicity, mice | |
|---|---|---|
| | Intravenous | Oral |
| Disodium salt of $N_{1,1}$-tetramethylene-$N_3$-phosphoryl-guanidine. | 185 | Ca. 920. |
| Disodium salt of $N_{1,1}$-(3-oxa-pentylene)-$N_3$-phosphoryl-guanidine. | 750 | Atoxic 900. |
| Disodium salt of $N_5$-phosphoryl-$N_1$-furfuryl-biguanide. | 490 | Do. |
| Disodium salt of $N_5$-phosphoryl-$N_{1,1}$-(3-oxa-pentylene)-biguanide. | Atoxic 800 | Do. |
| Disodium salt of $N_5$-phosphoryl-$N_1$-cyclohexyl-biguanide. | 490 | Do. |
| Disodium salt of $N_5$-phosphoryl-$N_1$-benzyl-bignanide. | 255 | Ca. 525. |

(II) Hypoglycemic activity

The hypoglycemic activity has been studied on male rats C D (Charles River strain) of 200 to 250 g., of which the glycemia is controlled before, then after 4 days of daily treatment orally. The serum glucose is determined by the method of Hoffman, W. S. (J. Biol. Chem. 1937, 120, 51).

The following products have been studied by way of example in a range of oral doses between 100 and 400 mg./kg. and the results are expressed in percentage variation of the glycemia of the treated animals with respect to those of the controls. In the table below, the coefficients of hypoglycemic activity are given.

| Product | Dose, mg./kg. | Hypoglycemic activity, percent |
|---|---|---|
| Disodium salt of $N_{1,1}$-tetramethylene-$N_3$-phosphoryl-guanidine | 100 | −9 |
| Disodium salt of $N_{1,1}$-tetramethylene-$N_3$-phosphoryl guanidine | 200 | −30 |
| Disodium salt of $N_{1,1}$-tetramethylene-$N_3$-phosphoryl-guanidine | 400 | −23 |
| Disodium salt of $N_5$-phosphoryl-$N_1$-furfuryl-biguandie | 400 | −13 |
| Disodium salt of $N_5$-phosphoryl-$N_1$-cyclohexyl-biguanide | 400 | −10 |
| Disodium salt of $N_5$-phosphoryl-$N_1$-benzyl-biguanide | 400 | −43 |

For comparison, it may be indicated that the $N_1$-furfuryl-biguanide is about 8 times more toxic than the $N_5$-phosphoryl-$N_1$-furfuryl-biguanide but is only about twice as active as this latter product and that the $N_{1,1}$-tetramethylene-guanidine is about 3 times more toxic than the $N_{1,1}$-tetramethylene-$N_3$-phosphorylguanidine and has practically the same activity as the latter.

THERAPEUTIC APPLICATION

The products according to the invention may be used in human therapeutics in the treatment of all forms of diabetes in compressed tablets, cachets, gelatine-coated pills or suppositories containing doses of 50 to 500 mg. of active principle and in injectable solutions. The posology may vary from 100 to 2000 mg. per day according to the product and the method of administration.

What is claimed is:

1. A process for the treatment of hyperglycemia in a patient which comprises administering to said patent (1) orally, (2) in the form of a suppository, (3) by intravenous perfusion or (4) by intramuscular puncture at amounts from 100 to 2000 mg. per day, a compound selected from the group consisting of the disodium salt of $N_{1,1}$-tetramethyl-$N_3$-phosphoryl-guanidine and the disodium salt of $N_5$-phosphoryl $N_1$-benzylbiguanide.

2. A process for the treatment of hyperglycemia in a patient which comprises administering to said patient (1) orally, (2) in the form of a suppository, (3) by intravenous perfusion or (4) by intramuscular puncture at amounts from 100 to 2000 mg. per day a compound of the formula:

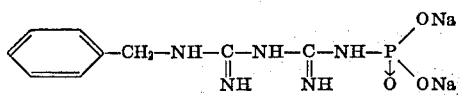

References Cited

The Pharmacological Basis of Therapeutics (1965), pp. 1594, 1595, The MacMillan Company, New York.

ALBERT T. MEYERS, Primary Examiner

F. E. WADDELL, Assistant Examiner

U.S. Cl. X.R.

260—247.5 R, 293.87, 296 R, 326.61, 347.7, 502.5, 940, 945; 424—200, 203